United States Patent [19]

Harrison

[11] Patent Number: 5,163,984
[45] Date of Patent: Nov. 17, 1992

[54] FILTER ELEMENT
[75] Inventor: John Harrison, Rochdale, England
[73] Assignee: Scapa Group plc, Blackburn, England
[21] Appl. No.: 804,324
[22] Filed: Dec. 10, 1991

[30] Foreign Application Priority Data

Dec. 13, 1990 [GB] United Kingdom ............... 9027051

[51] Int. Cl.⁵ .............................................. B01D 46/04
[52] U.S. Cl. ....................................... 55/292; 55/302; 55/343; 55/510; 55/521
[58] Field of Search ................. 55/292, 302, 343, 485, 55/510, 527, 498, 521

[56] References Cited

U.S. PATENT DOCUMENTS

| | | | |
|---|---|---|---|
| 2,426,405 | 8/1947 | McDermott | 55/510 |
| 3,386,580 | 6/1968 | Grabarczyk | 55/485 X |
| 3,708,965 | 1/1973 | Domnick | 55/527 X |
| 3,847,577 | 11/1974 | Hansen | 55/485 X |
| 4,171,963 | 10/1979 | Schuler | 55/302 |
| 4,259,097 | 3/1981 | Patel et al. | 55/485 X |
| 5,002,594 | 3/1991 | Merritt | 55/302 |

FOREIGN PATENT DOCUMENTS 3824622 2/1990 Fed. Rep. of Germany.

Primary Examiner—Charles Hart
Attorney, Agent, or Firm—Keck, Mahin & Cate

[57] ABSTRACT

A filter module (12) is proposed which includes a multiplicity of tubes arranged in side-by-side disposition to provide an annular array of flow passages (16) disposed about a common centre (17). The tubes comprise a filter material, and the disposition thereof is such as to maximize the filtration area whilst minimizing space utilization. A plurality of filter modules (12) is arranged in stacked relationship, corresponding tubes of the respective elements being in fluid flow relationship and one end of the stack being closed by a bottom plate (33). (FIGS. 1 and 2).

10 Claims, 2 Drawing Sheets

FILTER ELEMENT

The invention concerns an improved filter element and has more particular reference to filters of the kind used for separating contaminants from air and fluid materials.

It is known from DE-OS 3824622 (RAPP) to provide a filter element comprising a plurality of filter tubes arranged in side-by-side linear configuration, the tubes extending between and being secured in sealed relationship to spaced, parallel end plates the upper one of which is apertured to provide openings therein each in register with a respective one of the filter tubes and the filter tubes being defined by a filter medium, for example a permeable paper, textile or like material.

In use of the filter element aforesaid, a pressure differential exists between the interior of the filter tubes and contaminated environment, and air or gas is accordingly drawn towards the filter from the surrounding environment. The filter medium serves to prevent passage of the contaminants to be removed through the filter medium, such contaminants, for example dust from a dust laden atmosphere, being held on the surface of the medium. Dust free air is thus drawn through the filter tubes.

An important requirement of filtration equipment is to provide a maximum filtration surface within a minimum volume and the present invention is predicated upon the appreciation that, whilst the arrangement proposed in DE-OS 3823622 aforesaid does represent an advance in this regard over prior art structures existing at the date of the invention the subject matter thereof, further improvement is both desirable and indeed possible.

Thus, according to the present invention there is proposed a filter element comprising an array of filter tubes arranged in side-by-side configuration and extending between and secured to end plates at the respective ends thereof, at least one of said end plates being apertured in register with the said filter tubes, characterised in that the said array of side-by-side filter tubes is arranged in endless form to define a filter sleeve having inner and outer surfaces in fluid flow connection with the material to be filtered.

According to a preferred feature, a filter comprises a plurality of filter elements arranged in coaxial relationship, corresponding tubes of successive ones of the said plurality of elements being arranged in fluid flow connection, opposite ends of the said plurality of filter elements being secured to respective end plates and one said end plate being apertured in register with the filter tubes to provide access to the interior of the filter tubes.

According to a further preferred feature, each array of side-by-side filter tubes comprises a filter medium arranged in concertina-shaped configuration and secured to a second sheet of filter medium to form side-by-side flow tubes therebetween, the second sheet preferably being of concertina-shaped configuration.

According to a still further preferred configuration, the or each array of side-by-side tubes comprises two sheets of filter medium of similar concertina-shaped configuration arranged in back-to-back disposition, one sheet being offset from the other by one half of the pitch of the corrugations, thereby to bring the peak of the corrugation of one sheet in abutment with the troughs of the corrugations of the other sheet, and the sheets being secured together in such offset disposition.

The invention will now be described further, by way of example, with reference to the accompanying drawings in which.

Figure 1:
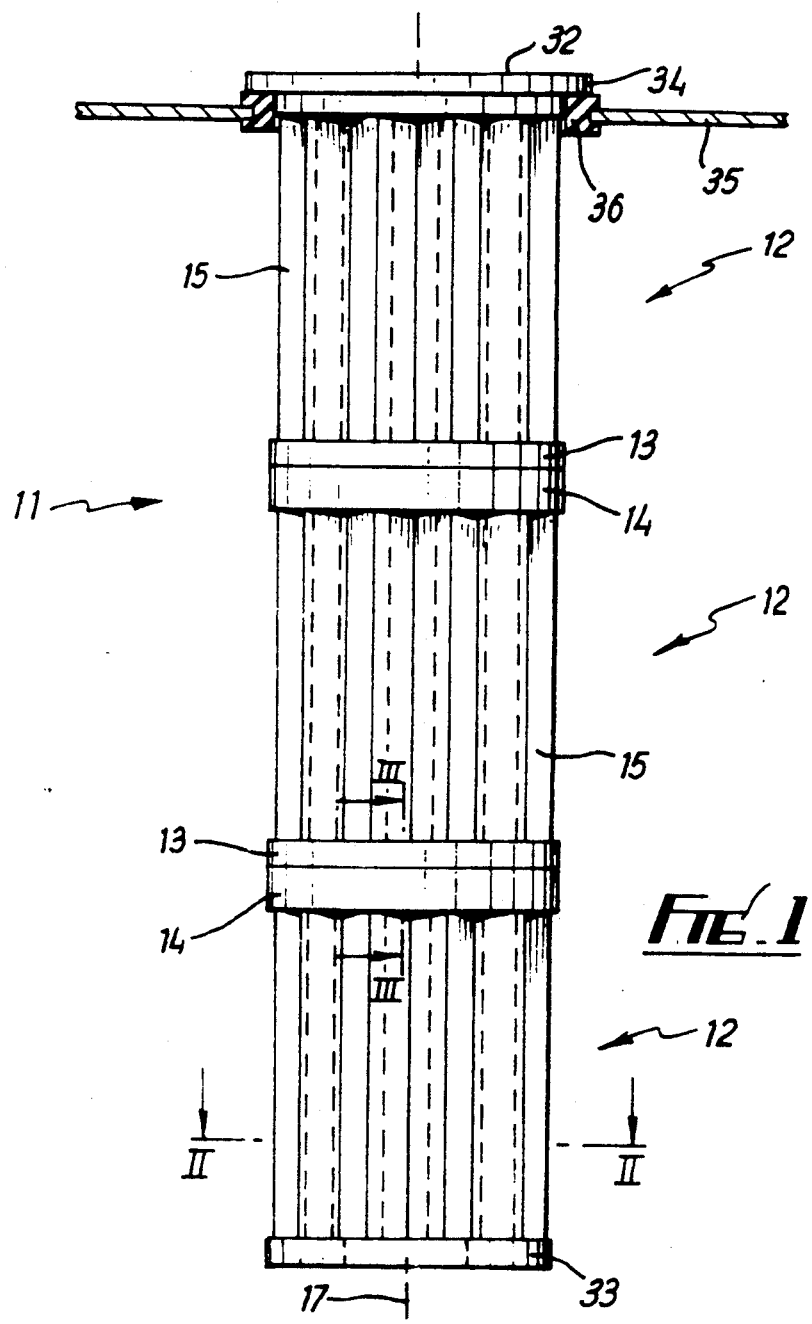
FIG. 1 is a front elevation of a filter sleeve constructed in accordance with the invention.
Figure 2:
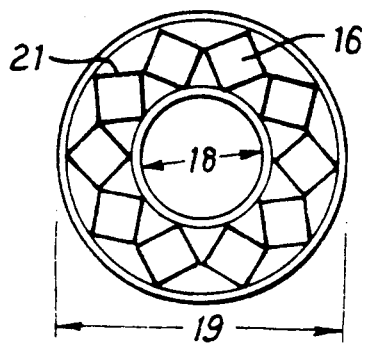
FIG. 2 is a section on line II—II of FIG. 1.

Referring now to the drawing, a dust or like filter assembly 11 comprises a plurality of modules 12, each of sleeve form, arranged in sealed coaxial relationship one to another through cooperable connectors 13, 14, the annular wall 15 of each module being of double concertina configuration and providing an array of flow passages 16 at equal centres about a common axis 17.

In the arrangement illustrated the modules 12 are three in number, and each sleeve wall 15 has ten flow passages 16 therein each of rhombus-shaped transverse cross-section. The inside diameter 18 and the outside diameter 19 of the sleeve are approximately 55 mm and 110 mm respectively, the side wall 21 of each flow passage is approximately 20 mm wide and each module 12 has an axial length of approximately 150 mm.

The filter material defining the sleeve-like wall of each module preferably comprises a stiffened needled felt of a kind presently used for filtration purposes, and will be of a permeability appropriate to the specific context in which the filter assembly is to be used. However, alternative materials may be used, such as, for example, a stiffened non-woven fabric comprising a resin-treated carded web containing a proportion of low-melt fibres whereby, on heating, the web becomes a coherent permeable sheet.

Figure 3:
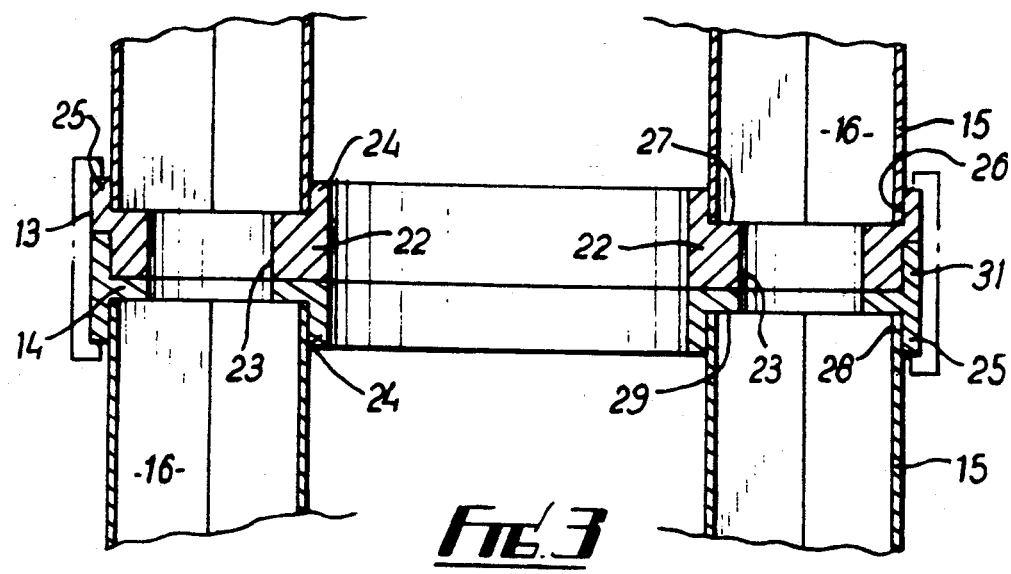
FIG. 3 is a section on line III—III of FIG. and shows the manner in which successive modules are connected together.

Connectors 13 provided at the lower ends of the upper and middle modules, see FIG. 3, each comprise an annular disc 22 having apertures 23 therein each for registration with a respective flow passage 16, there being axially directed flanges 24, 25 at the inner and outer peripheries of the disc 22 to define a channel between which the lower end of the annular wall 15 of the module is located, the lower edge 26 of the wall 15 being secured to the annular surface 27 of the connector 13 as by an adhesive. The underside of connector 13 is stepped at its outer periphery for a purpose hereafter to be made apparent.

Connectors 14 provided at the upper ends of the middle and lower modules are similarly of annular form and also have apertures 23 therein in axial alignment with the flow passages 16. Axially directed flanges 24, 25 are provided about the inner and outer peripheries of the annular disc 22 to define a channel at the underside of such disc to receive the upper edge 28 of the annular wall 15 of the module, the wall being secured to the surface 29 of the disc as by an adhesive. The upper surface of each of the connectors 14 has a peripheral flange 31 thereto to provide a seating to receive the stepped periphery at the underside of connector 13.

The upper end of the upper module receives a circular top plate 32 having depending flanges, to form a channel to engage the top of the annular wall 15, whilst the lower end of the lower module is engaged between radially spaced flanges (not shown) upstanding from an annular bottom plate 33, the concertina walls of the respective modules being secured to the top and bottom plates. In common with connectors 13, 14, the top plate is provided with through apertures in register with flow passages 16, whilst bottom plate 33 is devoid of such apertures. Top plate 32 extends radially outwardly beyond the outer flange, to provide a lip 34 for engagement with a casing 35 from which the assembly is supported, there being a sealing means 36 between the assembly 11 and casing 35.

If desired, suitable sealing means will also be provided between the co-operable connectors 13, 14.

Figure 4:
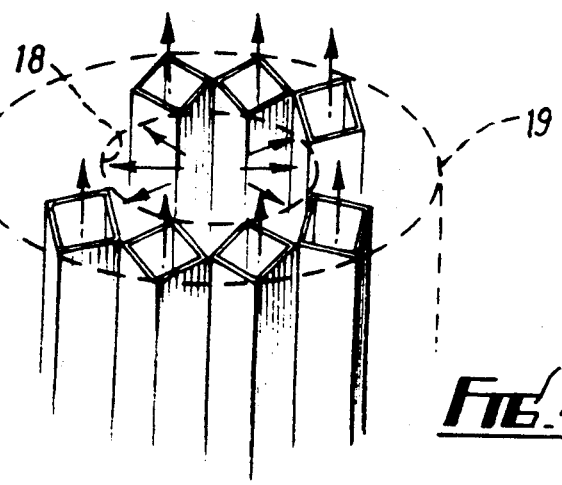
FIG. 4 is a diagrammatic perspective view showing the manner in which the dust laden air approaches the sleeve.

In use, see now particularly FIG. 4, air is exhausted from the contaminated atmosphere in which the filter assembly is located by virtue of a pressure differential existing between the flow passages and the contaminated atmosphere being filtered,. the flow passages of the uppermost module being in axial alignment with those of the underlying modules. The relatively lower pressure within the flow passages draws air from the contaminated environment into the flow passages through the radially inner and radially outer surfaces of the annular wall 16, contaminants being filtered out at the wall surfaces and clear air passing radially into the flow passages and axially upwardly thereof.

Figure 5:
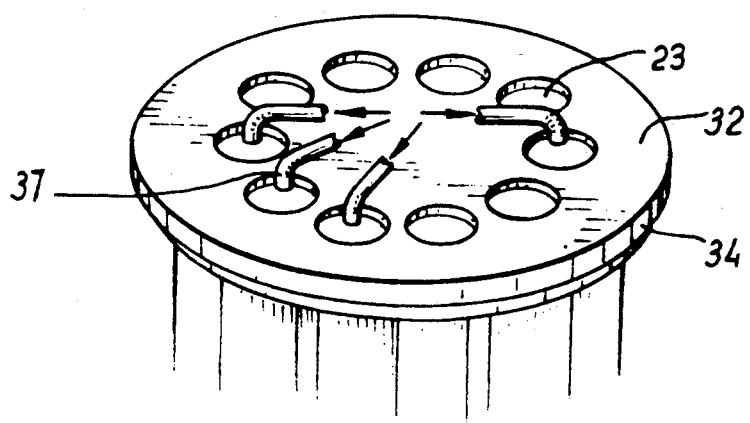
FIG. 5 is a diagrammatic illustration of the means whereby the dust is freed from the filter medium.

In order to facilitate cleaning of the filter medium (see now FIG. 5), a high pressure air jet 37 is provided in register with the upper end of each flow passage, such jets serving, upon simultaneous or segmental operation, to create a shock wave to travel down the respective flow passages and, by means of a whiplash effect, to free the filter medium of the bulk of the contaminant which falls to a suitable collector, not shown. The inherent strength of the joined side-by-side filter tubes, and more particularly the mutual support of the tubes one for another, resists collapse as a result, for example, of pressure forces to which the tubes are subjected during cleaning.

In an alternative arrangement, not illustrated, a conventional venturi pulse jet arrangement is applied to the top of the module to direct a pulsed jet of pressure air into the annular space defined by and within the array of flow passages, to dislodge contaminant from the surface of the filter material. It will be appreciated that any necessary steps will be taken to blank off the space inwardly of the annular sleeve-like filter during the cleaning step.

The invention is not restricted to the precise form of the assembly herein set forth, since alternatives will readily present themselves to one skilled in the art.

Thus, for example, whilst it has been found to be convenient to utilise flow passages of rhombus-shaped cross-sectional form, as provided, for example, by connecting together two concertina-shaped sheets of filter medium in direct back-to-back configuration, other cross-sectional forms may be adopted. Thus, for example, concertina-shaped sheets may be connected in offset disposition to give flow passages of rhomboid form, or indeed a cylindrical sleeve or filter medium may be combined with a sheet of concertina form.

Furthermore, the invention is not limited to a sleeve of circular cross-section as shown in the drawings, and other forms of sleeve may be adopted. For example, the array of side-by-side filter tubes may define a sleeve of square or other transverse cross-section.

The module may, of course, be of materially different dimensions from the module hereinbefore described, and modules having a length of 1000 mm or more are contemplated, the more general axial extent being within the range of, say, 500-600 mm. The module length and the transverse dimensions thereof will, of course, be selected according to specific requirements.

Whilst the preferred filter material is a stiffened needled felt, alternatives, for example permeable plastics materials, i.e. non-fibrous, may be used if preferred.

Although the preferred manner of attachment of the ends of the filter material to the respective connectors is by means of an adhesive, alternative seal-forming means may be used.

The connector means may also be of a form different from that described and illustrated, and in this regard it may be found sufficient to provide a connector at one end only of the module and to arrange that such connector will receive the free end of an annular wall into sealing engagement therewith.

As will be appreciated, the module concept herein proposed does facilitate replacement of a damaged or worn filter element as necessary.

It is to be understood, however, that the structure herein proposed may be utilised in lieu of existing filter means on conventional dust collecting equipment.

I claim:

1. A filter element comprising
   an array of filter tubes arranged in side-by-side configuration,
   end plates between which the tubes extend and to which said tubes are secured,
   at least one of said end plates being apertured in register with said filter tubes,
   said array of side-by-side filter tubes being arranged in endless form to define a filter sleeve having inner and outer surfaces in fluid flow connection with the material to be filtered.

2. A filter element as claimed in claim 1, wherein the array of side-by-side filter tubes comprises a filter medium arranged in concertina-shaped configuration and secured to a second sheet of filter medium to form side-by-side flow tubes therebetween.

3. A filter element as claimed in claim 1, wherein the array of side-by-side tubes comprises two sheets of filter medium of similar concertina-shaped configuration arranged in back-to-back disposition, one sheet being offset from the other by one half of the pitch of the corrugations, thereby to bring the peak of the corrugation of one sheet in abutment with the troughs of the corrugations of the other sheet, and the sheets being secured together in such offset disposition.

4. A filter element as claimed in claim 1, wherein each tube comprises a permeable stiffened needled felt.

5. A filter element as claimed in claim 1, wherein the end plates are of annular form, each plate having an inwardly facing surface and said inwardly facing surfaces being grooved to receive the corresponding end of the filter tubes into seating engagement therewith.

6. A filter element as claimed in claim 5, wherein the end plates at the respective ends include complementary formations for cooperative engagement with a similar filter element on stacking a plurality of such elements in end-to-end configuration.

7. A filter comprising
   a plurality of filter elements arranged in end-to-end coaxial relationship,
   each filter element comprising a module defined by an array of filter tubes arranged in side-by-side configuration, an end plate to which said array is secured, said end plate having apertures therein in register with said filter tubes, said array being arranged in endless form to define a filter sleeve having inner and outer filter surfaces, corresponding tubes of successive ones of said plurality of elements being arranged in fluid flow connection, and a closure plate at the extremities of the array.

8. A filter as claimed in claim 7, wherein an end plate is provided at each end of each filter element, the end plates, being apertured in register with said filter tubes to provide intermediate successive arrays of filter tubes, for fluid flow connection between successive elements, adjacent end plates of successive elements being secured together in sealed relationship.

9. A filter as claimed in claim 7, further including cleaning means registrable with the upper end of each flow passage and adapted, upon operation, to direct a shock wave into each said passage.

10. A filter as claimed in claim 9, wherein the cleaning means is adapted to be operable in sequence in relation to successive flow passages.

* * * * *